(12) United States Patent
Ewans

(10) Patent No.: US 7,452,252 B2
(45) Date of Patent: Nov. 18, 2008

(54) ROWING- AND SCULLING-BOAT ELECTRIC-SWITCH OPERATION

(76) Inventor: John Frayn Ewans, 201 West Wycombe Road, High Wycombe, Buckinghamshire (GB) HP12 3AW ( * ) Notice: Subject to any disclaimer, the term of this patent is extended or adjusted under 35 U.S.C. 154(b) by 0 days.

(21) Appl. No.: 11/473,508

(22) Filed: Jun. 23, 2006

(65) Prior Publication Data
US 2006/0292940 A1 Dec. 28, 2006

(30) Foreign Application Priority Data
Jun. 24, 2005 (GB) ................................. 0512882.2

(51) Int. Cl.
*B60L 15/20* (2006.01)
(52) U.S. Cl. ......................................................... 440/7
(58) Field of Classification Search ................. 114/153; 440/7
See application file for complete search history.

(56) References Cited

U.S. PATENT DOCUMENTS 2,654,335 A * 10/1953 Ball ............................ 114/153
5,481,997 A * 1/1996 Arndt .......................... 114/347
5,765,499 A * 6/1998 McKenzie .................... 114/347
2005/0103607 A1* 5/2005 Mezhinsky ................. 200/86.5

\* cited by examiner

*Primary Examiner*—Stephen Avila
(74) *Attorney, Agent, or Firm*—Davis Bujold & Daniels P.L.L.C.

(57) ABSTRACT

Operation of an electric microswitch 14 for timing or other purposes during rowing is brought about by the rower moving the heels 8 of his/her shoes 3 in opposite sideways directions transitorily. A unit 10 containing the switch 14 involves two plates 19,20 that are tied by cords 11 to the two heels 8 respectively within the foot-well 6 of the boat, so as to slide relative to one another against a spring bias when the heels 8 move apart. The microswitch 14 operates in response to the sliding to energize an LED 16 for sending a light pulse via fibre-optic cable 23 to a timing unit 24. A modified unit 10 includes a wireless transmitter 25 in place of the LED 16, and an alternative modification involves two parallel fibre-optic cables 26,27 from the unit 24 and an optical block 32. The block 32 is moved in response to the heel-movement from where light transmitted by the unit 24 down the cable 26 is not reflected back via the cable 27, to where the light is reflected back up the cable 27 from reflective surfaces 36,37 of block 32. Light reflected back to the unit 24 via the cable 27.

7 Claims, 4 Drawing Sheets

ROWING- AND SCULLING-BOAT ELECTRIC-SWITCH OPERATION

This invention relates to rowing- and sculling-boat electric-switch operation, and in particular to methods of such operation and to apparatus for achieving such operation in rowing and sculling boats.

For convenience of description, the term "rowing boat" will be used hereafter (including in the claims) to refer generically to both rowing boats and sculling boats, and reference to "rower" is to be understood as a reference to an oarsman or oarswoman of either kind of boat without distinction.

There are circumstances in which it would be advantageous for a rower of a rowing boat used for racing to be able to operate an electric switch for signalling or other purposes. In particular, it would be of assistance during training if the rower were able to operate an electric switch to mark the start, or end, of a phase in the progress of the boat; for example, the speed of the boat over a measured course could be determined from the interval between successive switch operations. However, the rower of a racing boat is expected to be fully involved physically in the task of propulsion of the boat.

It is an object of the present invention to provide a method of operating an electric switch during rowing that requires minimal interference with the rower's involvement with rowing, and also apparatus for adapting a rowing boat for use of the method.

According to one aspect of the present invention there is provided a method of operating an electric switch during rowing of a rowing boat, wherein operation of the switch is effected by foot-movement of a rower of the boat.

The foot-movement to operate the switch may be derived from movement of one or both feet of the rower, and may be a combination of movements of the relevant foot or feet. In particular, the foot-movement to operate the switch may be relative movement between heels of the rower's feet, and such movement may be movement in which the heels move sideways away from one another.

According to another aspect of the present invention there is provided apparatus for use on a rowing boat, comprising foot-receiving means for receiving a rower's feet, an electric switch, and means coupled to the foot-receiving means to respond to relative movement between the received feet for operating the electric switch.

The foot-receiving means may comprise a pair of shoes, for example fixed pseudo-permanently in a foot-well of the rowing boat, for use by the rower, or may be a board or other member for engagement temporarily with a pair of shoes worn by the rower. Where a pair of shoes is involved, the means coupled to the foot-receiving may be a unit attached to the two shoes of the pair to respond to movement of the two shoes in opposite directions relative to one another. More especially, the unit may be attached (for example by cords or straps) to heels of the shoes for responding to movement of the heels sideways away from one another.

A method according to the invention, and apparatus for adapting a rowing boat for use of the method according to the invention, will now be described, by way of example, with reference to the accompanying drawings, in which.

Figure 1:
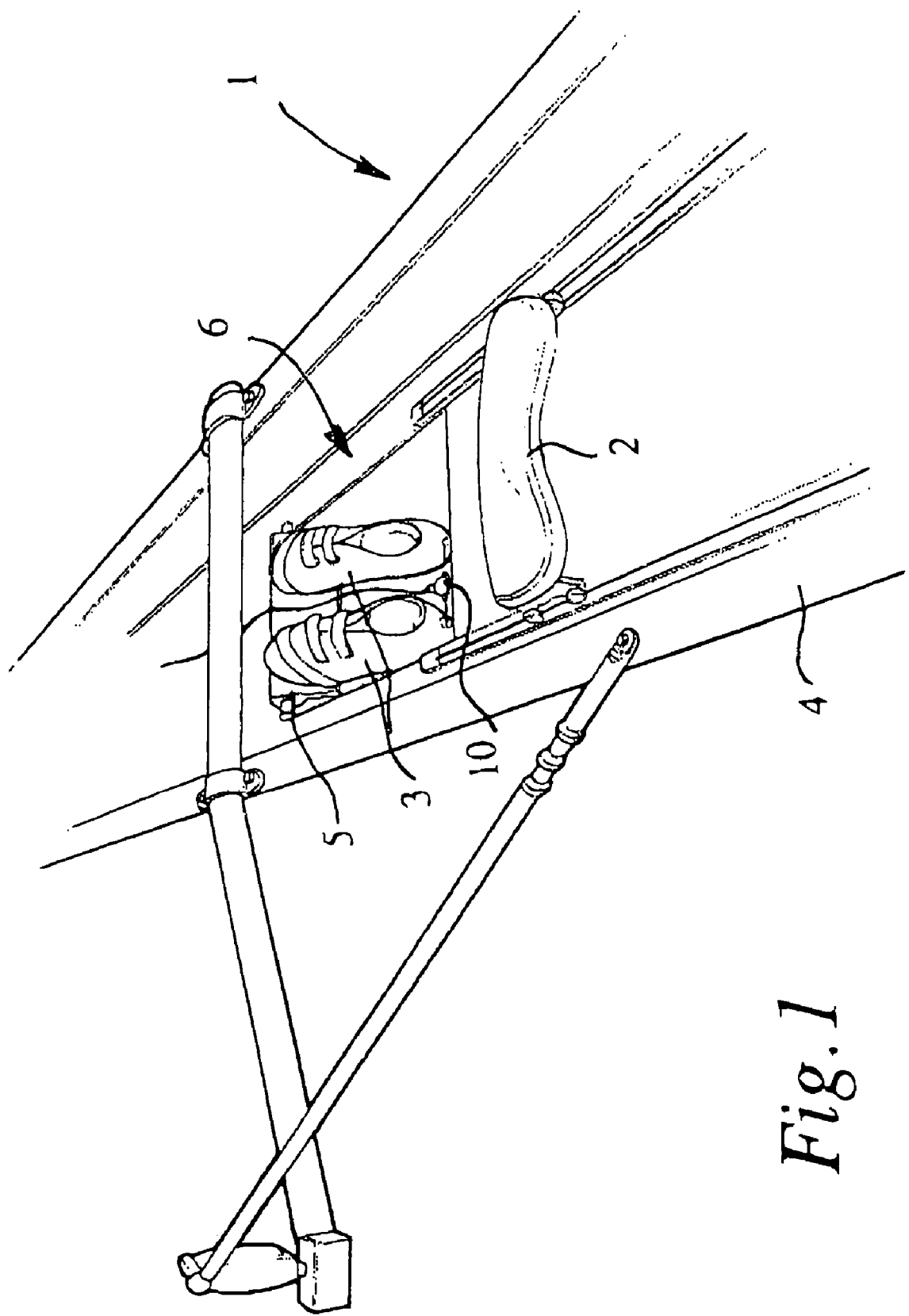
FIG. 1 is a perspective view of a rower's position in a rowing boat that incorporates apparatus for use of the method according to the invention.

Referring to FIG. 1, the rower's position 1 in the rowing boat is conventional in that it includes a sliding seat 2 and a pair of shoes 3 that are fixed pseudo-permanently by their soles to the hull 4 of the boat via an inclined board 5 within the foot-well 6 of the boat. The rower when occupying the seat 2 secures his/her feet in the shoes 3 so that they are held firmly in place during rowing.

Figure 2:
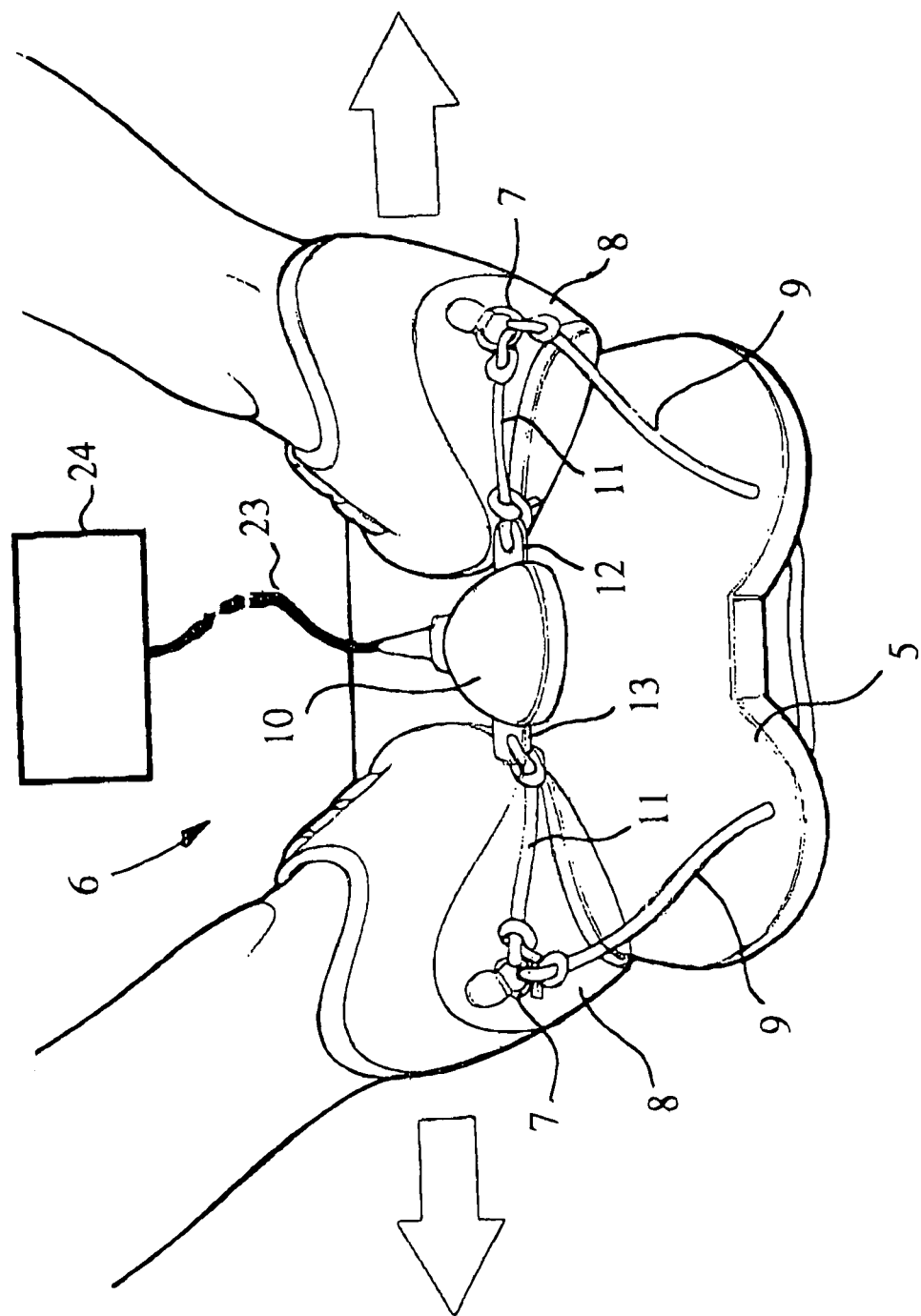
FIG. 2 shows detail to an enlarged scale of the apparatus of FIG. 1 within the foot-well of the rower's position.

Referring now more especially to FIG. 2, an anchor ring 7 is secured to the heel 8 of each shoe 3, and cords 9 are secured to the rings 7 to tether the heels 8 individually to the board 5. A unit 10 is tethered to the rings 7 by individual cords 11 so as to suspend it between the heels 8 with the two cords 11 tied to oppositely-extending ears 12 and 13 respectively of the unit 10. The lengths of the cords 11 are such that movement apart of the heels 8 is effective through the opposed forces exerted on the ears 12 and 13 of the unit 10 to bring about actuation of an electric switch. More particularly, the opposed forces exerted on the ears 12 and 13 result in relative, sliding movement within the unit 10, and this movement is utilised to operate the switch.

The switch itself may be located within the unit 10 or away from it. An example of a construction of the unit 10 incorporating the switch is illustrated in FIG. 3 and will now be described.

Figure 3:
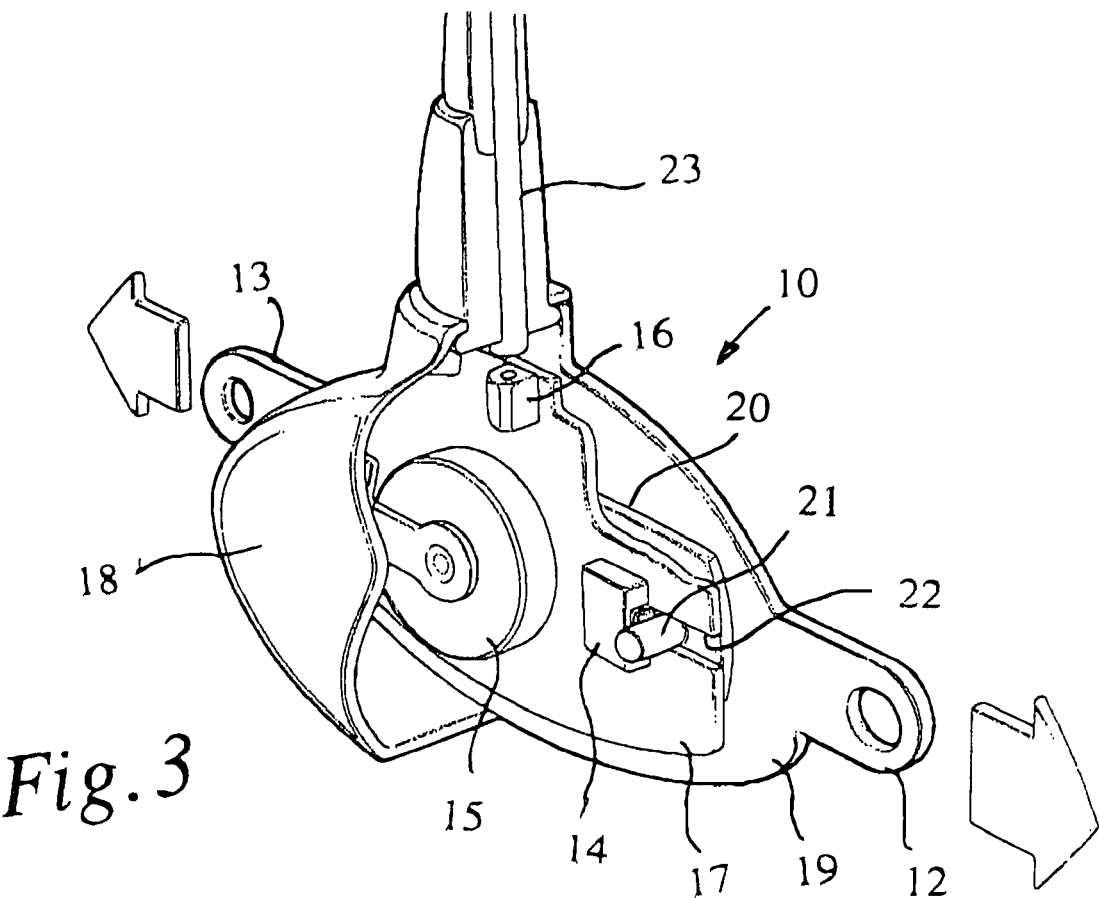
FIG. 3 is a perspective view partly in section, illustrative of a unit that forms part of the apparatus of FIG. 2.

Referring to FIG. 3, the switch in this example is an electric microswitch 14 that is mounted together with a battery 15 and a light-emitting diode (LED) 16 on a printed-circuit board 17 within a watertight casing 18 of the unit 10. The board 17 is mounted on a plate 19 which is fixed within the casing 18 and from which the ear 12 projects as an integral part through a watertight seal (not shown) of the casing 18.

The ear 13, which projects through a watertight seal (not shown) from within the casing 18, is as an integral part of a plate 20 that is mounted for face-to-face sliding movement between the fixed board 17 and plate 19. A pin 21 that is upstanding from the plate 20 is engaged within a slot 22 in the board 17 so as to be displaced along the slot 22 in response to relative movements of the plates 19 and 20 resulting from forces pulling the ears 12 and 13 in opposite directions away from one another. The microswitch 14 operates in response to this displacement of the pin 21 to energise the LED 16 from the battery 15 via circuitry of the board 17.

Displacement of the pin 21 along the slot 22 is opposed by a spring bias (provided for example by a leaf spring, not shown, acting on the pin 21) so that once the forces pulling the ears 12 and 13 in opposite directions away from one another are relaxed, the plates 19 and 20 return to a normal, retracted position with respect to one another, and the microswitch 14 returns to its unoperated state in which the LED 16 is no longer energized.

Accordingly, operation of the microswitch 14 within the unit 10 can be effected by the rower simply by a transitory movement of his/her heels apart during the normal up and down movement of them in rowing. The required movement can be achieved by sideways movement of both feet, or of just one foot, and can be carried out without interference with the rower's normal movements, rhythm and exertions in rowing.

The pulse of light emitted by the LED 16 in response to the transitory operation of the microswitch 14 is transmitted from the unit 10 via a flexible fibre-optic cable 23 to a unit 24 (FIG. 2) that provides the desired instrumentation for assisting the rower. For example, the unit 24 may be an electronic unit that provides a timing function and whose operation is initiated and terminated by the light pulses received from successive operations of the microswitch 14. If in this example the microswitch 14 is operated by the rower when the boat starts, and again when it finishes a measured course, the time interval recorded by the unit 24 may be used to calculate the boat's average speed. However, the measurement of time interval may be used otherwise, for example in conjunction with a count of strokes taken.

In order to reduce the likelihood of accidental, false operation, the circuit of the unit 24 may be such that it is responsive only to light pulses produced by operation of the microswitch 14 twice in close succession.

Figure 4:
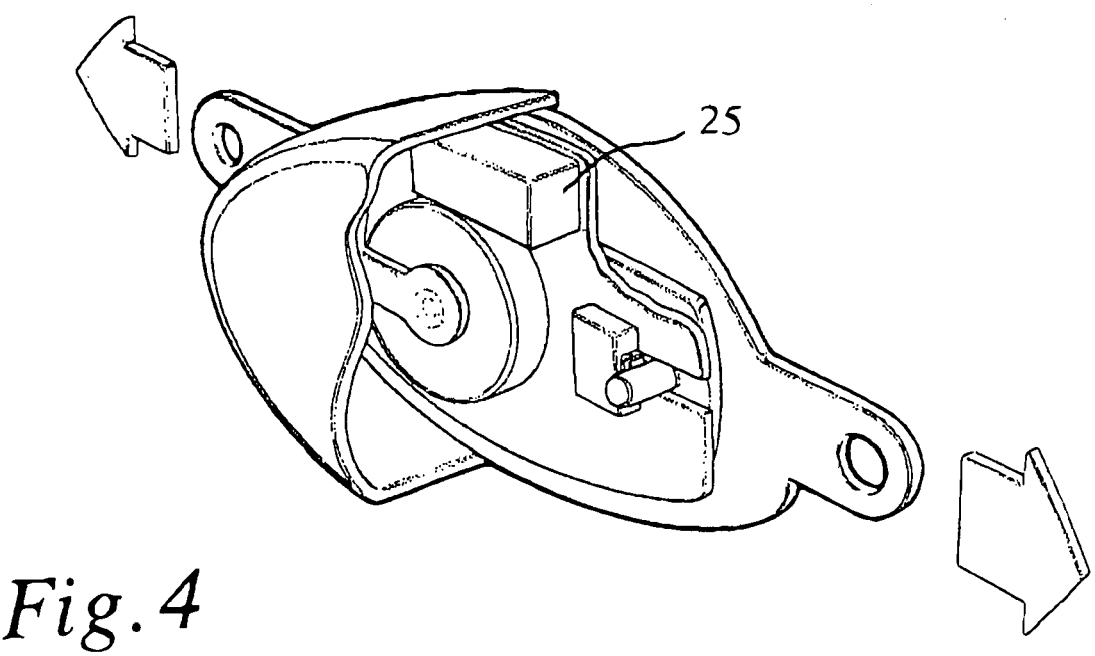
FIGS. 4 to 6 are illustrative of modifications of the unit of FIG. 3 and the apparatus of FIG. 2 generally.

A modified form of the unit 10 is illustrated in FIG. 4. In this case, communication between the units 10 and 24 is by wireless rather than by fibre-optics. The cable 23 is accordingly omitted and the LED 16 is replaced by a wireless transmitter 25 as illustrated in FIG. 4. The unit 24 in these circumstances will include an appropriate wireless receiver.

Figure 5:
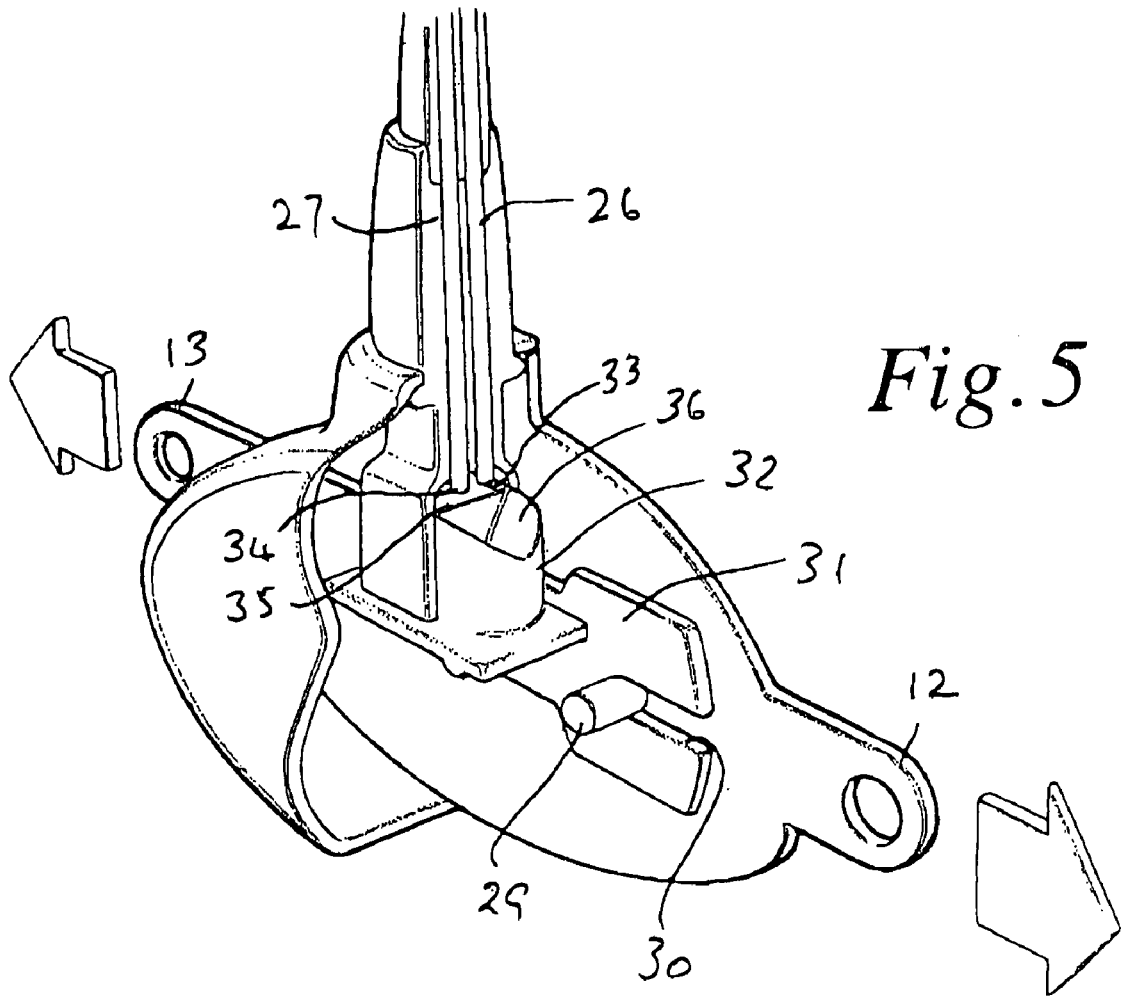

An alternative modification of the unit 10 is illustrated in FIG. 5. In this case, the printed-circuit board 17, and the microswitch 14, battery 15 and LED 16 carried by it, are omitted.

Referring to FIG. 5, two fibre-optic cables 26 and 27 are used for connection to the unit 24, and the ear 12 is in this cas part of a fixed plate 28 that has an upstanding pin 29. The pin 29 is engaged within a slot 30 of an elongate plate 31 which incorporates the ear 13 and which is displaced longitudinally with respect to the plate 28 against a spring bias, in response to forces pulling the ears 12 and 13 in opposite directions away from one another. Response to this relative displacement within the modified unit 10 is provided by means of an optical block 32 that is carried with the plate 31 to move beneath the exposed ends 33 and 34 of the fibre-optic cables 26 and 27 within the unit.

While no opposing forces are applied to the ears 12 and 13, the plate 31 is held by the spring bias with the pin 29 abutting the blind-end of the slot 30. In this position a matt, unreflective surface 35 of the block 32 lies immediately beneath the ends 33 and 34 of the cables 26 and 27. Displacement from this position under the effect of opposing forces applied to the ears 12 and 13 moves the block 32 to a position in which a pair of mutually-inclined reflecting surfaces 36 and 37, as illustrated more clearly in FIG. 6, lie beneath the ends 33 and 34 of the cables.

Figure 6:
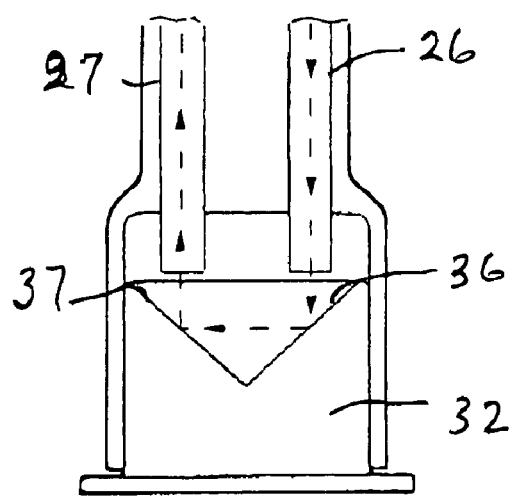

When using this modified form of the unit 10, light is transmitted from the unit 24 down the cable 26, so that while there is no relative displacement between the plates 28 and 31, and the cable-ends 33 and 34 are thereby positioned over the unreflective surface 35, there is no reflection of light back to the unit 24 via the cable 27. However, when there is displacement, light from the cable 26 as illustrated in FIG. 6, is reflected from the surface 36 to the surface 37 and thence back to the unit 24 via the cable 27, for the required response in the unit 24. Electric-switch operation in response to the rower's sideways foot-movement in this case is therefore effected in the unit 24, rather than in the modified unit 10, by means of the operation of an electronic switch circuit in the unit 24.

By way of further modification of the arrangement described above with reference to FIG. 2, the rings 7 may be replaced by straps and the cords 9 and 11 may be clipped to the ring or strap of each heel 8 instead of being tied.

I claim:

1. A method of operating an electric switch during rowing of a rowing boat, wherein operation of the switch is effected by foot-movement of a rower of the boat, shoes having heels are worn on the rower's feet, and the shoes are coupled via the heels to a unit located between the shoes, the unit being responsive to movement of the heels of the shoes relative to one another in opposite directions to operate the electric switch, the unit includes first and second members that are movable relative to one another, the first and the second members are coupled to the heels of the shoes respectively to move relative to one another in response to relative movement apart of the heels of the shoes, and the electric switch is carried by the first member for operation in response to the relative movement between the first and the second members, and operation of the electric switch causes a signal to be transmitted for use in a timing operation related to rowing of the rowing boat by the rower.

2. The method according to claim 1, wherein the signal is a light signal.

3. The method according to claim 1, wherein the signal is a wireless signal.

4. An apparatus, for use on a rowing boat, comprising foot-receiving means for receiving a rower's feet, an electric switch, and means coupled to the foot-receiving means to respond to relative movement between the received feet for operating the electric switch, wherein the foot-receiving means comprises a pair of shoes, and the means coupled to the foot-receiving means is a unit attached to the two shoes of the pair to respond to movement of the two shoes in opposite directions relative to one another, the unit includes first and second members that are movable relative to one another, the first and the second members are coupled to the two shoes respectively to move relative to one another in response to relative movement apart of the two shoes, and the electric switch is carried by the first member for operation in response to the relative movement between the first and the second members, and the apparatus including timing means for performing a timing function related to rowing of the rowing boat by a rower, and means responsive to operation of the electric switch to transmit a signal to the timing means, and the timing means being responsive to the signal transmitted to the timing means for performance of the timing function.

5. The apparatus according to claim 4, wherein the signal is a light signal.

6. The apparatus according to claim 4, wherein the signal is a wireless signal.

7. An apparatus, for use on a rowing boat, comprising foot-receiving means for receiving a rower's feet, an electric switch, and means coupled to the foot-receiving means to respond to relative movement between the received feet for operating the electric switch, wherein the foot-receiving means comprises a pair of shoes, and the means coupled to the foot-receiving means is a unit attached to the two shoes of the pair to respond to movement of the two shoes in opposite directions relative to one another, the unit includes first and second members that are movable relative to one another, the first and the second members are coupled to the two shoes respectively to move relative to one another in response to relative movement apart of the two shoes, and means responsive to the relative movement between the first and the second members to transmit a signal for operation of the electric switch, the electric switch is an electronic switch circuit that is responsive to the transmitted signal, and the transmitted signal is a light signal, and the unit includes optical means for deriving the light signal by reflection in dependence upon the relative movement between the first and the second members.

* * * * *